United States Patent
Curran et al.

[15] 3,689,652
[45] Sept. 5, 1972

[54] METHOD OF LOWERING BLOOD PRESSURE IN MAMMALS

[72] Inventors: William Vincent Curran, 27 Harding St., Pearl River, N.J. 10965; Adma Schneller Ross, 65 Campbell Ave., Suffern, N.J. 10901; Andrew Stephen Tomcufcik, 48 Dearborn Drive, Old Tappan, N.J. 07675

[22] Filed: Oct. 9, 1970

[21] Appl. No.: 79,671

[52] U.S. Cl. ................................................. 424/250
[51] Int. Cl. ............................................ A61k 27/00
[58] Field of Search.................... 424/250; 260/250 A

[56] References Cited

UNITED STATES PATENTS 3,475,431  10/1969  Bachmann et al. ..... 260/250 A

OTHER PUBLICATIONS

Chemical Abstracts 51:17453c (1957)

*Primary Examiner*—Jerome D. Goldberg
*Attorney*—Edward A. Conroy, Jr.

[57] ABSTRACT

This invention relates to new compositions of matter for lowering blood pressure. More particularly, it relates to therapeutic compositions containing certain 6-(substituted-phenyl)-4,5-dihydro-3(2H)-pyridazinones which operate to reduce blood pressure in mammals. The invention includes the new compositions of matter and methods of lowering blood pressure therewith.

10 Claims, No Drawings

METHOD OF LOWERING BLOOD PRESSURE IN MAMMALS

The invention is based upon the discovery that certain 6-(substituted-phenyl)-4,5-dihydro-3(2H)-pyridazinones are potent hypotensive agents. The 6-(substituted-phenyl)-4,5-dihydro-3(2H)-pyridazinones of the present invention may be represented by the following general formula:

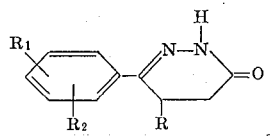

wherein R is hydrogen or methyl, $R_1$ is fluoro, chloro, bromo, iodo or methyl, and $R_2$ is hydrogen or chloro with the proviso that when $R_2$ is chloro then $R_1$ must be chloro

DETAILED DESCRIPTION OF THE INVENTION

The 6-(substituted-phenyl)-4,5-dihydro-3(2H)-pyridazinones, the active ingredients of the novel compositions of the present invention, may be readily prepared by the interaction of an appropriately substituted benzoylpropionic acid with hydrazine hydrate as set forth in the following reaction scheme:

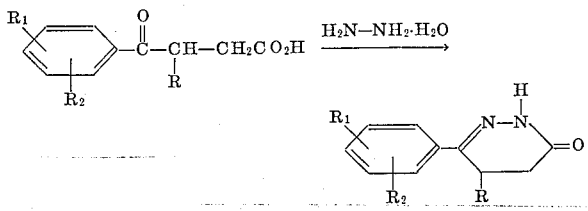

wherein R, $R_1$ and $R_2$ are as hereinabove defined. This reaction is preferably carried out in a solvent such as a lower alkanol, dioxane, tetrahydrofuran and the like at steam bath temperatures over a period of time of a few hours. The substituted benzoyl-propionic acids are readily obtained by the Friedel-Crafts condensation of an appropriately substituted benzene with succinic anhydride or with methylsuccinic anhydride in the presence of aluminum chloride. This reaction is preferably carried out at a temperature of 0°–60°C. and employing a stoichiometric excess of the aluminum chloride. A solvent such as carbon disulfide may be used or an excess of the substituted benzene, when liquid, may be used as solvent. The isomers which are obtained from methylsuccinic anhydride are readily separated by fractional crystallization from common organic solvents.

Typical compounds of the present invention which may be thus prepared are, for example, 6-(m-fluorophenyl)-4,5-dihydro-3(2H)-pyridazinone, 6-(o-fluorophenyl)-5-methyl-4,5-dihydro-3(2H)-pyridazinone, 6-(m-chlorophenyl)-5-methyl-4,5-dihydro-3(2H)-pyridazinone, 6-(o-chlorophenyl)-4,5-dihydro3(2H)-pyridazinone, 6-(o-bromophenyl)-4,5-dihydro-3(2H)-pyridazinone, 6 -(m-bromophenyl)-5-methyl-4,5-dihydro-3(2H)-pyridazinone, 6-(m-iodophenyl)-4,5-dihydro-3(2H)-pyridazinone, 6-(o-iodophenyl)-5-methyl-4,5-dihydro-3(2H)-pyridazinone, 6-(m-tolyl)-4,5-dihydro-3(2H)-pyridazinone, 6-(o-tolyl)-5-methyl-4,5-dihydro-3(2H)-pyridazinone, 6-(2,3-dichlorophenyl)-4,5-dihydro-3(2H)-pyridazinone, 6-(2,6-dichlorophenyl)-4,5-dihydro-3(2H)-pyridazinone, 6-(3,5-dichlorophenyl)-4,5-dihydro-3(2H)-pyridazinone, 6-(2,5-dichlorophenyl)-5-methyl-4,5-dihydro-3(2H)-pyridazinone, 6-(2,4-dichlorophenyl)-5-methyl-4,5-dihydro-3(2H)-pyridazinone, 6-(3,4-dichlorophenyl)-5-methyl-4,5-dihydro-3(2H)-pyridazinone, and the like.

The 6-(substituted-phenyl)-4,5-dihydro-3(2H)-pyridazinones of the present invention are materials which may be purified by crystallization from common organic solvents such as lower alkanols, acetone, dimethylformamide and the like. They are generally insoluble in water, but relatively soluble in organic solvents such as lower alkanols, esters, ketones, benzene, toluene and the like.

The 6-(substituted-phenyl)-4,5-dihydro-3(2H)-pyridazinones of the present invention may be administered either orally or parenterally. The amount of a single dose or of a daily dose to be given will vary but should be such as to give a proportionate dosage of from about 1 mg. to about 15 mg. per kilogram of body weight per day. Thus, such dosage units are employed that a total of from about 70 mg. to about 1.0 g. for a subject of about 70 kg. body weight are administered in a 24 hour period. This dosage regimen may be adjusted to provide the optimum therapeutic response, for example, several doses of 25–250 mg. may be administered daily or the dose may be proportionately reduced as indicated by the exigencies of the therapeutic situation.

The 6-(substituted-phenyl)-4,5-dihydro-3(2H)-pyridazinones may be orally administered, for example, with an inert diluent or with assimilable edible carrier, or they may be enclosed in hard or soft gelatin capsules, or they may be compressed into tablets, or they may be incorporated directly with the food of the diet. For oral therapeutic administration, the active compounds of this invention may be incorporated with excipients and used in the form of tablets, troches, capsules, elixirs, suspensions, syrups, wafers, and the like. Such compositions and preparations should contain at least 0.1 percent of active compound. The percentage in the compositions and preparations may, of course, be varied and may conveniently be between about 5 to about 75 percent or more of the weight of the unit. The amount of active compound in such therapeutically useful compositions or preparations is such that a suitable dosage will be obtained. Preferred compositions or preparations according to the present invention are prepared so that an oral dosage unit form contains between about 25 and 250 milligrams of active compound.

The tablets, troches, pills, capsules and the like may also contain the following: a binder such as gum tragacanth, acacia, corn starch or gelatin; an excipient such s dicalcium phosphate; a disintegrating agent such as corn starch, potato starch, alginic acid and the like; a lubricant such as magnesium stearate; and a sweetening agent such as sucrose, lactose, or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar, or both. A syrup or elixir may contain the active compounds, sucrose as a sweetening agent, methyl and propyl parabens as preservatives, a dye and a flavoring such as cherry or orange flavor. Of course, any material used in preparing any dosage unit form should be pharmaceutically pure and substantially non-toxic in the amounts employed.

Compositions having the desired clarity, stability, and adaptability for parenteral use are obtained by dissolving from 0.10 to 10.0 percent by weight of a 6-(substituted-phenyl)-4,5-dihydro3(2H)-pyridazinone in a vehicle consisting of a mixture of non-volatile, normally liquid polyethylene glycols which are soluble in both water and organic liquids and which have molecular weights of from about 200 to about 1,500. Such mixtures of polyethylene glycols are commercially available and are usually obtained by condensing glycol with ethylene oxide. Although the amount of 6-(substituted-phenyl)-4,5-dihydro-3(2H)-pyridazinone dissolved in the above vehicle may vary from 0.10 to 10.0 percent by weight, it is preferred that the amount employed be from about 3.0 to about 9.0 percent by weight. Although various mixtures of the aforementioned non-volatile polyethylene glycols may be employed, it is preferred to use a mixture of non-volatile polyethylene glycols having an average molecular weight of about 400. Such a mixture is usually referred to as polyethylene glycol 400. A preferred embodiment comprises a clear solution of from about 3.0 to about 9.0 percent by weight of the 6-(substituted-phenyl)-4,5-dihydro-3(2H)-pyridazinone dissolved in an aqueous solution of polyethylene glycol 400. In addition to the 6-(substituted-phenyl)-4,5-dihydro-3(2H)-pyridazinone, the parenteral solutions may also contain various preservatives which may be used to prevent bacterial and fungal contamination or chemical degradation.

The following examples illustrate the preparation and hypotensive effect of the novel compositions of the present invention and the method of administering them.

EXAMPLE 1

Preparation of 6-(p-chlorophenyl)-4,5-dihydro-3(2H)-pyridazinone 3-(p-Chlorobenzoyl)propionic acid (67.5 g.) is dissolved in 350 ml. of water containing 20 g. of potassium hydroxide. Twenty ml. of hydrazine hydrate is added and the mixture is heated on a steam bath for two hours. Acetic acid (20 ml.) is added and the reaction mixture is heated for an additional two hours. The resulting crystalline product is filtered off and recrystallized from ethanol; m.p. 180°C.

EXAMPLE 2

Preparation of 6-(3,4-dichlorophenyl)-4,5-dihydro-3(2H)-pyridazinone 3-(3,4-Dichlorobenzoyl)propionic acid (75 g.) is dissolved in 350 ml. of water containing 20 g. of potassium hydroxide. Twenty ml. of hydrazine hydrate is added and the mixture is heated on a steam bath for two hours. Acetic acid (20 ml.) is added and the reaction mixture is heated for an additional 2 hours. The resulting crystalline product is filtered off and recrystallized from ethanol; m.p. 172°–173°C.

EXAMPLE 3

Preparation of 6-(2,5-dichlorophenyl)-4,5-dihydro-3(2H)-pyridazinone 3-(2,5-Dichlorobenzoyl)propionic acid (2.0 g.) is dissolved in 5 ml. ethanol and the solution is heated on a steam bath, 0.3 ml. of hydrazine hydrate is added, refluxed for two hours and cooled. White crystals are filtered off and recrystallized from ethanol; m.p. 174°–175°C.

EXAMPLE 4

Preparation of 6-(p-tolyl)-4,5-dihydro-3(2H)-pyridazinone

A solution of 10 g. of 3-(p-toluoyl)propionic acid in 20 ml. of ethanol containing 2.85 g. of hydrazine hydrate is refluxed for one hour, cooled and the white crystalline product is collected; m.p. 152.5°–155°C.

EXAMPLE 5

Preparation of 6-(p-bromophenyl)-4,5-dihydro-3(2H)-pyridazinone

A solution of 5.0 g. of 3-(p-bromobenzoyl)propionic acid in 19 ml. of 1N NaOH is heated on a steam bath. Hydrazine hydrate (0.75 ml.) is added and the solution is refluxed for 2 hours, cooled, and adjusted to pH 4.0. White crystals are filtered off and recrystallized from ethanol, m.p. 165°–166°C.

EXAMPLE 6

Preparation of 6-(p-fluorophenyl)-4,5-dihydro-3(2H)-pyridazinone

A solution of 9.8 g. of 3-(p-fluorobenzoyl)propionic acid and 1.9 ml. of hydrazine hydrate in 50 ml. 1N NaOH is heated on a steam bath for 2 hours. The solution is cooled to room temperature and adjusted to pH 4. Cream colored crystals are filtered off and recrystallized from ethanol; m.p. 190.5°–192.5°C.

EXAMPLE 7

Preparation of 6-(2,4-dichlorophenyl)-4,5-dihydro-3(2H)-pyridazinone

A solution of 10.0 g. of 3-(2,4-dichlorobenzoyl)propionic acid, 1.5 ml. of hydrazine hydrate and 15 ml. ethanol is refluxed for 1½ hours. Upon cooling, off-white crystals form which are filtered off and recrystallized from ethanol; m.p. 168.5°–169.5 °C.

EXAMPLE 8

Preparation of 6-(p-iodophenyl)-4,5-dihydro-3(2H)-pyridazinone

A solution of 3.0 g. of 3-(p-iodobenzoyl)propionic acid, 0.4 ml. of hydrazine hydrate, and 30 ml. ethanol is refluxed for 2 ½ hours, cooled and filtered. The white crystals obtained are recrystallized from ethanol-water; m.p. 199.0°–199.5°C.

EXAMPLE 9

Preparation of 6-(p-chlorophenyl)-5-methyl-4,5-dihydro-3(2H)-pyridazinone

A solution of 1.0 g. of 3-(p-chlorobenzoyl)butyric acid, 0.3 ml. of hydrazine hydrate and 7 ml. ethanol is refluxed for 2 ½ hours and then cooled. White crystals are filtered off and recrystallized from ethanol; m.p. 203.5°–204.5°C.

EXAMPLE 10

Hypotensive activity of 6-(substituted-phenyl)-4,5-dihydro-3(2H)-pyridazinones in normotensive rats Conscious male albino Sherman strain rats were fastened to rat boards in a supine position by means of canvas vests and limb ties. The femoral areas were anesthetized by subcutaneous infiltration of lidocaine. The left or right common iliac arteries were exposed and clamped off proximally by an artery clamp and distally with thread. Incisions were made near the tie and short nylon catheters were inserted and tied in place. The other end of the catheters were fitted with 24 gauge hubless needles attached to thick-walled polyethylene tubes. The 6-(substituted-phenyl)-4,5-dihydro-3(2H)-pyridazinones were administered to the animals orally by stomach tube. The compounds were suspended in 2% aqueous starch solution at a concentration such that 1 ml. per 100 g. of body weight gave the animal the desired dose. Volume was usually 2.5 ml. since the rats average 250 g. in weight. Mean arterial blood pressure was measured 4 hours after administration of the compounds. Comparisons were then made to the mean control pressure of 121 ± 7 mm. of mercury. Blood pressure measurements were made with four Statham P23 Db strain gauges attached to a Sanborn Polyviso Recorder. The recorder is equipped with four strain gauge preamplifiers with averaging circuits for measuring mean arterial pressure. Table I below summarizes the effects on mean blood pressure (MBP) of typical 6-(substituted-phenyl)-4,5-dihydro-3(2H)-pyridazinones of the present invention, 4 hours after administration to a series of rats. Under the conditions of this experiment, the 6-(substituted-phenyl)-4,5-dihydro-3(2H)-pyridazinones of the present invention demonstrate hypotensive activity.

TABLE I

| Compound | Oral Dose mg./kg. of body weight | No. of rats | MBP mm. Hg |
|---|---|---|---|
| Controls | | 50 | 121 ± 7 |
| 6-(p-chlorophenyl)-4,5-di-hydro-3(2H)-pyridazinone | 100 | 4 | 97 ± 10 |
| 6-(3,4-dichlorophenyl)-4,5--dihydro-3(2H)-pyridazinone | 100 | 1 | 96 |
| 6-(2,5-dichlorophenyl)-4,5--dihydro-3(2H)-pyridazinone | 100 | 5 | 100 ± 13 |
| 6-(p-tolyl)-4,5-dihydro-3(2H)--pyridazinone | 100 | 3 | 95 ± 13 |
| 6-(p-bromophenyl)-4,5-dihydro--3(2H)-pyridazinone | 100 | 2 | 85 ± 4 |
| 6-(p-fluorophenyl)-4,5-dihydro-3(2H)-pyridazinone | 100 | 8 | 93 ± 12 |
| 6-(2,4-dichlorophenyl)-4,5--dihydro-3(2H)-pyridazinone | 100 | 3 | 99 ± 2 |
| 6-(p-iodophenyl)-4,5-dihydro-3(2H)-pyridazinone | 100 | 5 | 89 ± 12 |
| 6-(p-chlorophenyl)-5-methyl--4,5-dihydro-3(2H)-pyridazinone | 100 | 2 | 85 ± 0 |

EXAMPLE 11

Preparation of Tablet Formulation

| Ingredient | Per Tablet (g.) | For 10,000 Tablets (g.) |
|---|---|---|
| Active ingredient: 6-(p-chlorophenyl)-4,5-dihydro-3(2H)-pyridazinone | 0.0500 | 500 |
| Lactose | 0.0800 | 800 |
| Corn Starch (for mix) | 0.0150 | 150 |
| Corn Starch (for paste) | 0.0100 | 100 |
| Total | 0.1550 | 1.550 |
| Magnesium Stearate (1%) | 0.0013 | 12.5 |
| Total | 0.1563 | 1.562.5 |

The active ingredient, lactose and corn starch (for mix) are blended together. The corn starch (for paste) is suspended in 800 milliliters of water and heated with stirring, to form a paste. This paste is then used to granulate the mixed powders. Additional water is used, if necessary. The wet granules are passed through a No. 8 hand screen and dried at 120°F. The dry granules are then passed through a No. 16 screen. The mixture is lubricated with 1 percent magnesium stearate and compressed into tablets in a suitable tableting machine.

EXAMPLE 12

Preparation of Oral Syrup Formulation

| Ingredient | Amount |
|---|---|
| Active ingredient: 6-(3,4-dichlorophenyl)-4,5-dihydro-3(2H)-pyridazinone | 1000 mg. |
| Sorbitol solution (70% N.F.) | 40 ml. |
| Sodium benzoate | 150 mg. |
| Sucaryl | 90 mg. |
| Saccharin | 10 mg. |
| Red dye (F.D. & C. No. 2) | 10 mg. |
| Cherry flavor | 50 mg. |
| Distilled water, q.s. ad | 100 ml. |

The sorbitol solution is added to 40 ml. of distilled water and the active ingredient is suspended therein. The sucaryl, saccharin, sodium benzoate, flavor and dye are added and dissolved in the above solution. The volume is adjusted to 100 ml. with distilled water.

Other ingredients may replace those listed in the above formulation. For example, a suspending agent such as bentonite magma, tragacanth, carboxymethylcellulose or methylcellulose may be used. Phosphates, citrates or tartrates may be added as buffers. Preservatives may include the parabens, sorbic acid and the like and other flavors and dyes may be used in place of those listed above.

EXAMPLE 13

Preparation of Parenteral Formulation

In a solution of 119 ml. of propylene glycol and 30 ml. of distilled water was dissolved 8.5 g. of 6-(p-tolyl)-4,5-dihydro-3(2H)-pyridazinone, with stirring. After dissolution was complete, a solution of 850 mg. of sodium formaldehyde sulfoxylate in 3.0 ml. of distilled water was then added to the formulation. The pH of this solution was then adjusted to 7.0 with ethanolamine and the volume was made up to 170 ml. with distilled water. The formulation was filtered through a fine sintered glass filter, filled into 5.0 ml. ampoules each containing 2.0 ml., and sealed under nitrogen.

We claim:

1. A therapeutic composition in the form of a tablet, troche, capsule or wafer for lowering blood pressure in mammals comprising from about 70 mg. to about 1.0 gram per daily dosage unit of a compound of the formula:

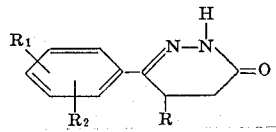

wherein R is selected from the group consisting of hydrogen and methyl, $R_1$ is selected from the group consisting of fluoro, chloro, bromo, iodo and methyl, and $R_2$ is selected from the group consisting of hydrogen and chloro with the provisio that when $R_2$ is chloro then $R_1$ is chloro; and a pharmaceutical carrier.

2. A therapeutic composition in accordance with claim 1 wherein R is methyl, $R_1$ is para-bromo, and $R_2$ is hydrogen.

3. A therapeutic composition in accordance with claim 1 wherein R is methyl, $R_1$ is para-chloro, and $R_2$ is hydrogen.

4. A therapeutic composition in accordance with claim 1 wherein R is methyl, $R_1$ is para-iodo, and $R_2$ is hydrogen.

5. A therapeutic composition in accordance with claim 1 wherein R is hydrogen, $R_1$ is para-iodo and $R_2$ is hydrogen.

6. The method of lowering blood pressure in a mammal which comprises administering internally to said mammal an effective amount of a compound of the formula:

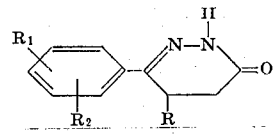

wherein R is selected from the group consisting of hydrogen and methyl, $R_1$ is selected from the group consisting of fluoro, chloro, bromo, iodo and methyl, and $R_2$ is selected from the group consisting of hydrogen and chloro with the proviso that when $R_2$ is chloro then $R_1$ is chloro; in association with a pharmaceutical carrier to provide a daily dosage of from about one mg. to about 15 mg. per kilogram of body weight of the mammal.

7. The method as defined in claim 6 wherein R is methyl, $R_1$ is para-bromo, and $R_2$ is hydrogen.

8. The method as defined in claim 6 wherein R is methyl, $R_1$ is para-chloro, and $R_2$ is hydrogen.

9. The method as defined in claim 6 wherein R is methyl, $R_1$ is para-iodo, and $R_2$ is hydrogen.

10. The method as defined in claim 6 wherein R is hydrogen, $R_1$ is para-iodo, and $R_2$ is hydrogen.

* * * * *